(12) United States Patent
Wang et al.

(10) Patent No.: US 12,252,889 B2
(45) Date of Patent: Mar. 18, 2025

(54) CONSTRUCTION METHOD FOR RADIATION-PROOF CONCRETE HOLE RESERVED SPLIT BOLT

(71) Applicants: China Railway The Third Engineering Group Construction and Installation Engineering Co., Ltd., Taiyuan (CN); The Third Engineering Group Co., Ltd. of China Railway, Taiyuan (CN)

(72) Inventors: Zhiqiang Wang, Taiyuan (CN); Xiaofeng Wang, Taiyuan (CN); Huasong Yin, Taiyuan (CN); Wei Wu, Taiyuan (CN); Junyi Meng, Taiyuan (CN); Liangliang Lian, Taiyuan (CN); Xiuru Cheng, Taiyuan (CN); Zhipeng Yao, Taiyuan (CN); Wenkui Gao, Taiyuan (CN); Yuan Zhao, Taiyuan (CN); Ze Zhang, Taiyuan (CN); Le Ren, Taiyuan (CN); Yingbo Dong, Taiyuan (CN); Lin Li, Taiyuan (CN); Yajuan Zhang, Taiyuan (CN)

(73) Assignees: China Railway The Third Engineering Group Construction and Installation Engineering Co., Ltd., Taiyuan (CN); The Third Engineering Group Co., Ltd. of China Railway, Taiyuan (CN)

( * ) Notice: Subject to any disclaimer, the term of this patent is extended or adjusted under 35 U.S.C. 154(b) by 399 days.

(21) Appl. No.: 17/844,760

(22) Filed: Jun. 21, 2022

(65) Prior Publication Data
US 2023/0020298 A1    Jan. 19, 2023

(30) Foreign Application Priority Data
Jul. 16, 2021   (CN) .......................... 202110805307.9

(51) Int. Cl.
*E04G 17/065* (2006.01)
*E04G 15/06* (2006.01)
*E04G 17/07* (2006.01)

(52) U.S. Cl.
CPC ....... *E04G 17/0655* (2013.01); *E04G 15/061* (2013.01); *E04G 17/0652* (2013.01); *E04G 17/0714* (2013.01)

(58) Field of Classification Search
CPC ............ E04G 17/0652; E04G 17/0655; E04G 17/0714; E04G 15/061
See application file for complete search history.

(56) References Cited

U.S. PATENT DOCUMENTS

| 1,809,962 A | * | 6/1931 | Colt | .................... E04G 17/0714 |
| | | | | 425/DIG. 129 |
| 2,001,052 A | * | 5/1935 | Colt | .................... E04G 17/0742 |
| | | | | 249/217 |

(Continued)

FOREIGN PATENT DOCUMENTS

| CN | 104264797 A | 1/2015 |
| CN | 109958281 A * | 7/2019 |

(Continued)

OTHER PUBLICATIONS

Jixiao Hao, et al., Construction of radiation-proof concrete structure in inspection room, Expansive Agents & Expansive Concrete, 2008, pp. 110-113, No. 2.

*Primary Examiner* — Jessie T Fonseca
(74) *Attorney, Agent, or Firm* — Bayramoglu Law Offices LLC

(57) ABSTRACT

A construction method for a radiation-proof concrete hole reserved split bolt includes: 1) mounting a hole reserved sleeve; 2) mounting an inclined recoverable split bolt; 3) mounting an inclined split bolt; 4) fixing the inclined recoverable split bolt and an inclined split bolt main body; 5)

(Continued)

pouring concrete, and dismantling related components; 6) plugging the inclined split bolt main body; and 7) plugging the hole reserved sleeve. According to the construction method, the hole reserved sleeve is obliquely arranged, the inner side of the hole reserved sleeve is sprayed with a radiation-proof coating with the functions of reducing radiation ray reflection and absorbing certain radiation rays, and in addition, after the construction of a pipeline or a line in the hole reserved sleeve is finished, the openings at both ends of the hole reserved sleeve are plugged with a radiation-proof mortar incorporated with a micro-expanding agent and a waterproof agent.

5 Claims, 3 Drawing Sheets

(56) References Cited

U.S. PATENT DOCUMENTS

| | | | | |
|---|---|---|---|---|
| 2,222,339 | A * | 11/1940 | Schenk | E04G 17/0714 |
| | | | | 249/46 |
| 2,236,616 | A * | 4/1941 | Bosco | E04G 17/0721 |
| | | | | 425/DIG. 129 |
| 2,709,292 | A * | 5/1955 | Otti | E04G 17/0721 |
| | | | | 249/43 |
| 3,437,309 | A * | 4/1969 | Tausanovitch | E04G 17/0714 |
| | | | | 249/43 |
| 3,606,238 | A * | 9/1971 | Shoemaker | E04G 17/0714 |
| | | | | 249/40 |
| 3,858,993 | A * | 1/1975 | Lovisa | E04G 17/0714 |
| | | | | 403/374.2 |
| 3,933,332 | A * | 1/1976 | Lovisa | E04G 17/0714 |
| | | | | 249/43 |
| 4,726,560 | A * | 2/1988 | Dotson | E04G 17/0714 |
| | | | | 249/46 |

FOREIGN PATENT DOCUMENTS

| | | | | | |
|---|---|---|---|---|---|
| CN | 110700585 A | * | 1/2020 | | |
| CN | 211341782 U | | 8/2020 | | |
| CN | 112031479 A | | 12/2020 | | |
| CN | 213115457 U | | 5/2021 | | |
| CN | 113062590 A | * | 7/2021 | | E04G 17/00 |
| KR | 101770172 B1 | | 9/2017 | | |
| WO | WO-03040494 A1 | * | 5/2003 | | E04G 17/0714 |

* cited by examiner

CONSTRUCTION METHOD FOR RADIATION-PROOF CONCRETE HOLE RESERVED SPLIT BOLT

CROSS REFERENCE TO THE RELATED APPLICATIONS

This application is based upon and claims priority to Chinese Patent Application No. 202110805307.9, filed on Jul. 16, 2021, the entire contents of which are incorporated herein by reference.

TECHNICAL FIELD

The present invention relates to the technical field of radiation-proof concrete formwork, and in particular to a construction method for a radiation-proof concrete hole reserved split bolt.

BACKGROUND

With the development of society, the irradiation technology is widely applied to the industries of medical treatment, food, radiation sterilization of medicines and the like. The radiation-proof concrete structure is not easy to be penetrated by radioactive rays, has shielding capability on the radiation of γ rays, X rays or neutron and thus is a main radiation shielding structure. At present, the radiation-proof concrete structure is widely used in atomic energy reactors, particle accelerators and radiation sterilization industries of medical treatment, food, medicines and the like, and is an important barrier for ensuring the safety of operators and the surroundings.

The split bolts of the concrete templates, the wall bushing, the structure reserved holes and other parts are weak points of the whole concrete radiation-proof structure system. According to the characteristic that radiation rays are transmitted along a straight line, in order to eliminate the weakening influence of weak points on the whole radiation-proof structure, the weak points are required not to be directly penetrated. For the split bolt, a threaded split bolt is usually adopted and left in the concrete structure to prevent radiation leakage; for the wall bushing and the structure reserved holes, specific treatment measures are taken to arrange them in a labyrinth manner to prevent radiation leakage. In fact, by treating the split bolts of the templates, the wall bushing and the structure reserved holes separately, the number of weak parts in the concrete structure is not reduced, and a certain potential risk of radiation leakage still exists.

Consequently, in order to reduce and eliminate the weakening risk of the split bolts of the concrete templates, the wall bushing and the structure reserved holes to the whole radiation-proof structure, and to render the radiation-proof structure safer and more reliable, an effective radiation-proof concrete hole reserved split bolt is needed urgently.

SUMMARY

The present invention aims to overcome the defects in the prior art and provides a construction method for a radiation-proof concrete hole reserved split bolt.

The radiation-proof concrete hole reserved split bolt comprises a hole reserved sleeve, an inclined recoverable split bolt, an inclined split bolt, wedge-shaped fasteners and nuts; wherein the hole reserved sleeve consists of a sleeve main body and first water stop sheets; the first water stop sheets are arranged at both ends and in the middle of the sleeve main body at equal intervals;

the outer diameter of the inclined recoverable split bolt is smaller than the inner diameter of the sleeve main body, the inclined recoverable split bolt penetrates through the hole reserved sleeve, templates on both sides of a structure to be concreted and supporting edges on the outer side of the templates, and both ends of the inclined recoverable split bolt are fixed in a split manner through the wedge-shaped fasteners and the nuts;

the inclined split bolt is arranged on both sides of the hole reserved sleeve at equal intervals and symmetrically arranged along a horizontal line which penetrates through the center of the hole reserved sleeve on the cross-section of a concrete structure; the inclined split bolt consists of an inclined split bolt main body, second water stop sheets, sealing rings and recoverable bolt joints; the second water stop sheets are arranged at both ends and in the middle of the inclined split bolt main body at equal intervals; the sealing rings are mounted at both ends of the inclined split bolt main body, the inclined split bolt penetrates through the templates on both sides of the structure to be concreted and the supporting edges on the outer side of the templates, and both ends of the inclined split bolt main body are fixed in a split manner through the recoverable bolt joints, the wedge-shaped fasteners and the nuts.

Preferably, the inner side of the hole reserved sleeve is sprayed with a radiation-proof coating.

Preferably, the wedge-shaped fastener is positioned between the supporting edge and the nut; the cross-section of the wedge-shaped fastener is a right triangle; the inclined plane of the wedge-shaped fastener is perpendicular to the inclined recoverable split bolt or the inclined split bolt.

Preferably, a gap between the inclined recoverable split bolt and the sleeve main body is filled with a rubber gasket.

Preferably, bolt holes at both ends of the inclined split bolt main body are connected with the recoverable bolt joints in a fitting manner; a portion of the sealing ring, which exceeds the inclined split bolt main body and the recoverable bolt joint, is tightly attached to the template and the concrete.

The construction method for a radiation-proof concrete hole reserved split bolt comprises the following steps:

1) before pouring is performed to form an underground radiation-proof concrete structure, adopting a radiation-proof concrete hole reserved split bolt; binding reinforcing bars of a structure to be concreted, mounting a template on one side of the structure to be concreted, and then mounting a hole reserved sleeve;

2) penetrating an inclined recoverable split bolt through the hole reserved sleeve, the mounted template and a supporting edge, and fixing one end of the inclined recoverable split bolt through a wedge-shaped fastener and a nut;

3) fixing one end of an inclined split bolt main body on the mounted template and the supporting edge through a sealing ring, a recoverable bolt joint, a wedge-shaped fastener and a nut;

4) mounting a template on the other side of the structure to be concreted, repeating the fixing method for the inclined recoverable split bolt in the step 2) and the fixing method for the inclined split bolt main body in the step 3) to fixedly mount the other ends of the inclined recoverable split bolt and the inclined split bolt main body on the template and a supporting edge on the other side of the structure to be concreted, and tightening the bolts in a split manner;

5) pouring concrete; after a strength of the concrete reaches a standard requirement, dismantling the wedge-shaped fasteners and the nuts for fixing the inclined recoverable split bolt, and pulling out the inclined recoverable split bolt in the hole reserved sleeve; dismantling the recoverable bolt joints, the wedge-shaped fasteners and the nuts for fixing the inclined split bolt main body; and dismantling the templates;

6) cleaning up floating dust and construction waste in bolt holes at both ends of the hole reserved sleeve and the inclined split bolt main body; and plugging the bolt holes at both ends of the inclined split bolt main body with a radiation-proof mortar incorporated with a micro-expanding agent and a waterproof agent, and spraying a radiation-proof coating on surfaces of the plugged bolt holes and the sealing rings; and 7) after the construction of a pipeline or a line in the hole reserved sleeve is finished, plugging the openings at both ends of the hole reserved sleeve with the radiation-proof mortar incorporated with the micro-expanding agent and the waterproof agent, and then spraying the radiation-proof coating on surfaces of the plugged openings at both ends of the hole reserved sleeve.

Preferably, in the step 1), temporary rubber plugs are arranged at both ends of the hole reserved sleeve for protection; the hole reserved sleeve is fixed on a main reinforcing bar of the structure to be concreted through the fasteners or in a steel wire binding mode.

Preferably, in the step 2), when the inclined recoverable split bolt is mounted, the temporary rubber plugs of the hole reserved sleeve are removed; and a gap between the inclined recoverable split bolt and a sleeve main body is fixed with a rubber gasket for temporary fixation.

Preferably, in the step 3), the inclined split bolt main body is fixed on the main reinforcing bar of the structure to be concreted through the fasteners or in a steel wire binding mode; a portion of the sealing ring, which exceeds the inclined split bolt main body and the recoverable bolt joint, is tightly attached to the template and the concrete.

Preferably, in the steps 6) and 7), the radiation-proof mortar is incorporated with a material with certain radiation absorption capacity.

The beneficial effects of the present invention are as follows:

1. According to the present invention, the radiation-proof concrete hole reserved split bolt structure combines portions of the wall bushing, the structure reserved holes and the split bolt holes of the concrete templates, so that the number of weak parts in the concrete structure is effectively reduced, a potential risk of radiation leakage is essentially reduced, and thus the radiation-proof structure is rendered safer and more reliable.

2. According to the present invention, the hole reserved sleeve is obliquely arranged, the inner side of the hole reserved sleeve is sprayed with a radiation-proof coating with the functions of reducing radiation ray reflection and absorbing certain radiation rays, and in addition, after the construction of a pipeline or a line in the hole reserved sleeve is finished, the openings at both ends of the hole reserved sleeve are plugged with the radiation-proof mortar incorporated with a micro-expanding agent and a waterproof agent, and the plugged openings are sprayed with the radiation-proof coating. These comprehensive measures are taken to eliminate the radiation leakage risk of the radiation-proof concrete hole reserved split bolt at the hole reserved sleeve.

3. According to the present invention, the sealing rings are arranged at both ends of the inclined split bolt main body, and in the mounting process of the concrete structure formwork and the inclined split bolt, the sealing rings are tightly attached to the templates, so that the inclined split bolt main body maintains the set inclined angle, rotation or displacement is prevented, and a good position limited effect is achieved. In another aspect, the sealing rings play the role in preventing the dust entering into the bolt holes at the both ends of the inclined split bolt main body, thereby ensuring the tight connection between the inclined split bolt main body and the recoverable bolt joint.

4. According to the present invention, the inclined split bolt is adopted in cooperation with the hole reserved sleeve and the inclined recoverable split bolt, so that the reasonable stress and the structural safety of the template of the concrete structure are ensured.

5. According to the present invention, after the bolt holes at both ends of the inclined split bolt main body are cleaned, they are plugged with the radiation-proof mortar incorporated with the micro-expanding agent and the waterproof agent, and the surfaces of the plugged bolt holes and the sealing rings are sprayed with the radiation-proof coating, so that the weakening influence of the inclined split bolt on the whole radiation-proof structure is eliminated.

6. According to the present invention, the inclined recoverable split bolt, the recoverable bolt joints, the wedge-shaped fasteners and the nuts can be recovered and reused, and thus the construction concept of energy conservation, green and environmental protection is met.

Figure 1:
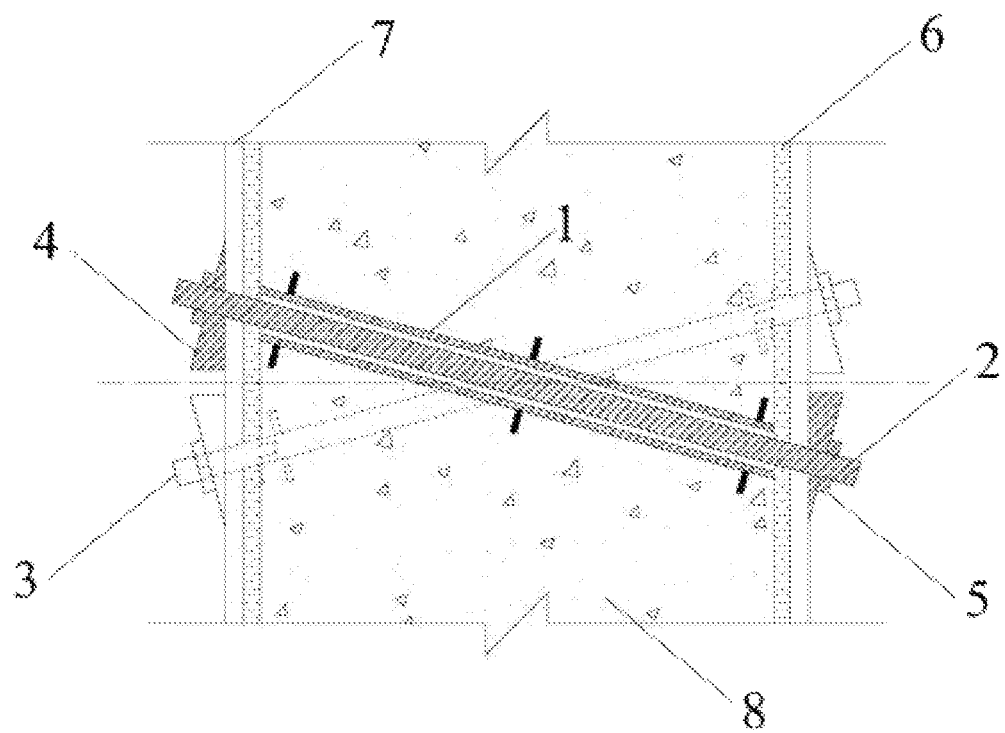
FIG. 1 is a schematic diagram of a radiation-proof concrete hole reserved split bolt structure.
Figure 2:
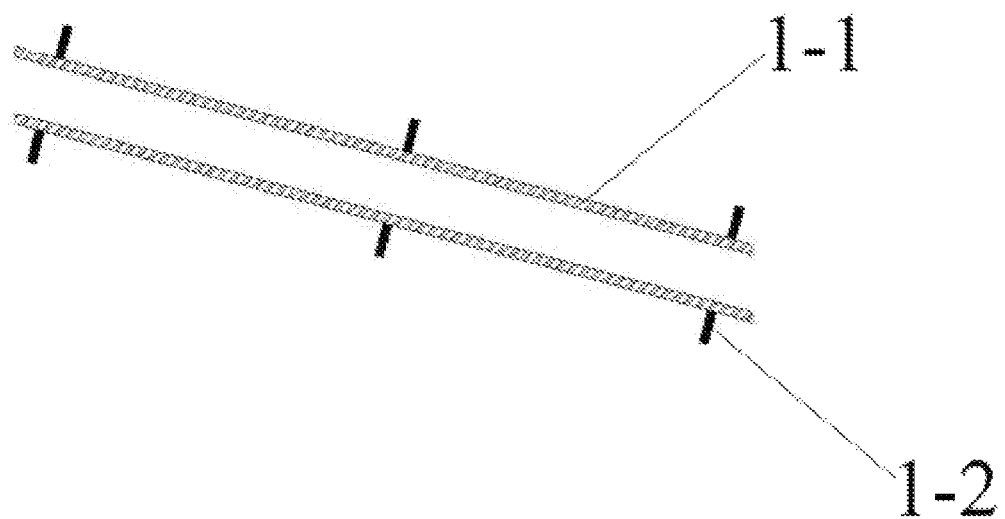
FIG. 2 is a cross-sectional view of a hole reserved sleeve.
Figure 3:
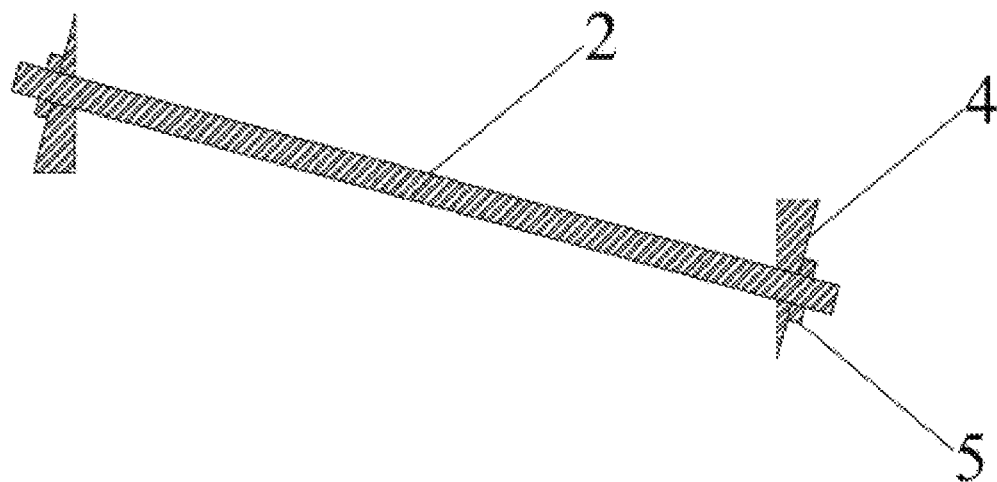
FIG. 3 is a cross-sectional view of an inclined recoverable split bolt, a wedge-shaped fastener and a nut.
Figure 4:
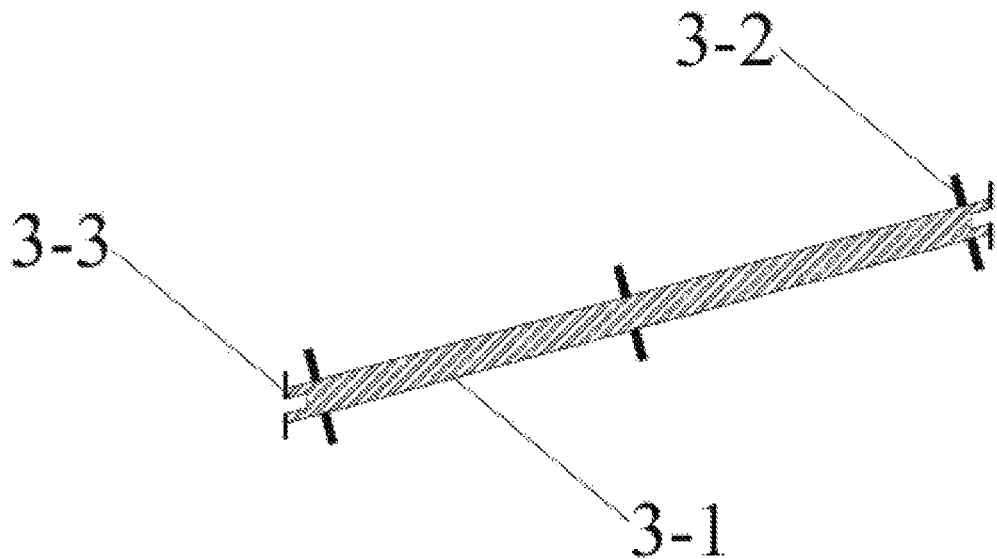
FIG. 4 is a cross-sectional view of an inclined split bolt main body.
Figure 5:
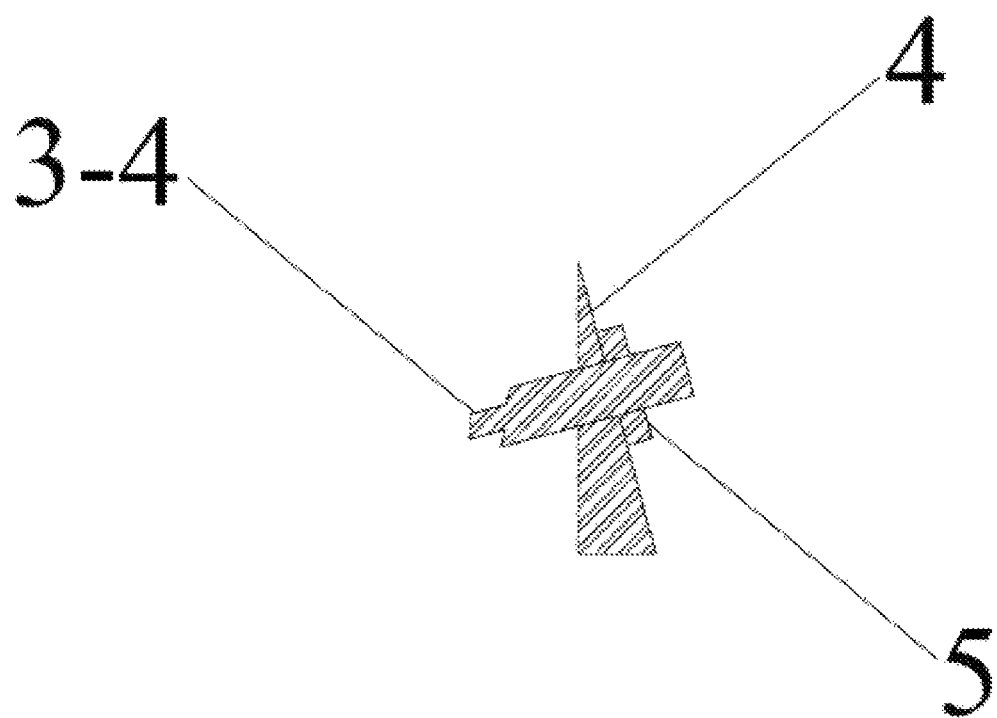
FIG. 5 is a cross-sectional view of a recoverable bolt joint, a wedge-shaped fastener and a nut.

In the figures, 1 represents hole reserved sleeve, 1-1 represents sleeve main body, 1-2 represents first water stop sheet, 2 represents inclined recoverable split bolt, 3 represents inclined split bolt, 3-1 represents inclined split bolt main body, 3-2 represents second water stop sheet, 3-3 represents sealing ring, 3-4 represents recoverable bolt joint, 4 represents wedge-shaped fastener, 5 represents nut, 6 represents template, 7 represents supporting edge, and 8 represents concrete.

DETAILED DESCRIPTION OF THE EMBODIMENTS

The present invention will be further described with reference to the following embodiments. The following embodiments are set forth merely to aid in the understanding of the present invention. It should be noted that, for those of ordinary skilled in the art, without departing from the principle of the present invention, it is possible to make several improvements and modifications to the present invention, and those improvements and modifications also fall within the protection scope of the claims of the present invention.

Embodiment I

The radiation-proof concrete hole reserved split bolt comprises a hole reserved sleeve 1, an inclined recoverable split bolt 2, an inclined split bolt 3, wedge-shaped fasteners 4 and nuts 5.

The hole reserved sleeve 1 consists of a sleeve main body 1-1 and first water stop sheets 1-2, wherein the first water stop sheets 1-2 are arranged at both ends and in the middle of the sleeve main body 1-1 at equal intervals.

The outer diameter of the inclined recoverable split bolt 2 is smaller than the inner diameter of the sleeve main body 1-1, so that the inclined recoverable split bolt 2 can smoothly penetrate through the sleeve main body 1-1. The inclined recoverable split bolt 2 penetrates through the hole reserved sleeve 1, templates 6 on both sides of a structure to be concreted and supporting edges 7 on the outer sides of the templates 6 and is fixed in a split manner through the wedge-shaped fasteners 4 and the nuts 5.

The inclined split bolt 3 is arranged on both sides of the hole reserved sleeve 1 at equal intervals and symmetrically arranged along a horizontal line which penetrates through the center of the hole reserved sleeve 1 on the cross-section of a concrete structure. The inclined split bolt 3 consists of an inclined split bolt main body 3-1, second water stop sheets 3-2, sealing rings 3-3 and recoverable bolt joints 3-4, wherein the second water stop sheets 3-2 are arranged at both ends and in the middle of the inclined split bolt main body 3-1 at equal intervals; the sealing rings 3-3 are mounted at both ends of the inclined split bolt main body 3-1 and play a role in stopping slurry and limiting position. The inclined split bolt 3 penetrates through the templates 6 and the supporting edges 7 on both sides of the structure to be concreted and is fixed in a split manner through the recoverable bolt joints 3-4, the wedge-shaped fasteners 4 and the nuts 5.

The inclination angle of the hole reserved sleeve 1 shall meet the requirements of the stress of the underground radiation-proof concrete structure pouring formwork, and the strength of the inclined recoverable split bolt 2, the inclined split bolt 3, the wedge-shaped fasteners 4, the nuts 5 and other split stress components.

The position of the hole reserved sleeve 1 is defined by the design position of the split bolts of the templates, and the reserved positions of the wall bushing and the structure reserved holes; the hole reserved sleeve 1 shall cover as much as possible of the wall bushing and the structure reserved holes under the condition that the design requirements are met.

The inner side of the hole reserved sleeve 1 is sprayed with a radiation-proof coating with the functions of reducing the reflection of radiation rays and absorbing certain radiation rays.

When the inclined recoverable split bolt 2 and the inclined split bolt 3 are not arranged symmetrically or the inclined split bolt 3 is difficult to mount, the inclined split bolt 3 can be replaced with a horizontal split bolt; when the horizontal split bolt is adopted, the inclination angle of the hole reserved sleeve 1 shall be remeasured.

The wedge-shaped fastener 4 is positioned between the supporting edge 7 and the nut 5; the cross-section of the wedge-shaped fastener 4 is a right triangle; the inclined surface of the wedge fastener 4 is perpendicular to the inclined recoverable split bolt 2 or the inclined split bolt 3.

A gap between the inclined recoverable split bolt 2 and the sleeve main body 1-1 is filled with a rubber gasket.

Bolt holes at both ends of the inclined split bolt main body 3-1 are connected with the recoverable bolt joints 3-4 in a fitting manner; a portion of the sealing ring 3-3, which exceeds the inclined split bolt main body 3-1 and the recoverable bolt joint 3-4, is tightly attached to the template 6 and the concrete 8.

Embodiment II

The construction method for the radiation-proof concrete hole reserved split bolt comprises the following steps:

1) before pouring is performed to form an underground radiation-proof concrete structure, adopting a radiation-proof concrete hole reserved split bolt; and binding reinforcing bars of a structure to be concreted, mounting a template on one side of the structure to be concreted, and then mounting a hole reserved sleeve 1; wherein temporary rubber plugs are arranged at both ends of the hole reserved sleeve 1 for protection, so that construction waste is prevented from falling into the mounted reserved sleeve 1; when the inclined recoverable split bolt 2 is mounted, the temporary rubber plugs are removed; the hole reserved sleeve 1 is fixed on a main reinforcing bar of the structure to be concreted through the fasteners or in a steel wire binding mode;

2) penetrating an inclined recoverable split bolt 2 through the hole reserved sleeve 1, the mounted template and a supporting edge, and fixing one end of the inclined recoverable split bolt through a wedge-shaped fastener 4 and a nut 5; and temporarily fixing a gap between the inclined recoverable split bolt 2 and a sleeve main body 1-1 in a rubber gasket filling mode;

3) fixing one end of an inclined split bolt main body 3-1 on the mounted template and the supporting edge through a sealing ring 3-3, a recoverable bolt joint 3-4, a wedge-shaped fastener 4 and a nut 5; fixing the inclined split bolt main body 3-1 on the main reinforcing bar of the concrete structure through the fasteners or in the steel wire binding mode; and tightly attaching a portion of the sealing ring 3-3, which exceeds the inclined split bolt main body 3-1 and the recoverable bolt joint 3-4, to the template 6 and the concrete 8;

4) mounting a template on the other side, repeating the fixing methods in the steps 2) and 3) to fixedly mount the other ends of the inclined recoverable split bolt 2 and the inclined split bolt main body 3-1 on the template and the supporting edge on the other side, and tightening the bolts in a split manner;

5) pouring the concrete 8; after a strength of the concrete reaches a standard requirement, dismantling the wedge-shaped fasteners 4 and the nuts 5 for fixing the inclined recoverable split bolt 2, and pulling out the inclined recoverable split bolt 2 in the hole reserved sleeve 1; dismantling the recoverable bolt joints 3-4, the wedge-shaped fasteners 4 and the nuts 5 for fixing the inclined split bolt main body 3-1; and dismantling the templates;

6) cleaning up floating dust and construction waste in bolt holes at both ends of the hole reserved sleeve 1 and the inclined split bolt main body 3-1; and plugging the bolt holes at both ends of the inclined split bolt main body 3-1 with a radiation-proof mortar incorporated with a micro-expanding agent and a waterproof agent, and spraying a radiation-proof coating on surfaces of the plugged bolt holes and the sealing rings 3-3, wherein the radiation-proof mortar is incorporated with a material with high density and certain radiation absorption capacity; and 7) after the construction of a pipeline or a line in the hole reserved sleeve 1 is finished, plugging openings at both ends of the hole reserved sleeve with the radiation-proof mortar incorporated with the micro-expanding agent and the waterproof agent, and then spraying the radiation-proof coating on surfaces of the plugged openings at both ends of the hole reserved sleeve 1.

What is claimed is:

1. A construction method for a radiation-proof concrete hole reserved split bolt, comprising the following steps:
   step 1): before pouring is performed to form an underground radiation-proof concrete structure, adopting the radiation-proof concrete hole reserved split bolt; binding reinforcing bars of a structure to be concreted, mounting a first template on a first side of the structure to be concreted, and then mounting a hole reserved sleeve;
   step 2): penetrating an inclined recoverable split bolt through the hole reserved sleeve, the first template and a first supporting edge, and fixing a first end of the inclined recoverable split bolt through a first wedge-shaped fastener and a first nut;
   step 3): fixing a first end of an inclined split bolt main body on the first template and the first supporting edge through a sealing ring, a recoverable bolt joint, a second wedge-shaped fastener and a second nut;
   step 4): mounting a second template on a second side of the structure to be concreted, penetrating the inclined recoverable split bolt through the hole reserved sleeve, the second template and a second supporting edge, and fixing a second end of the inclined recoverable split bolt through a first wedge-shaped fastener and a first nut, fixing a second end of the inclined split bolt main body on the second template and the second supporting edge through a sealing ring, a recoverable bolt joint, a second wedge-shaped fastener and a second nut, so as to fixedly mount the second end of the inclined recoverable split bolt and the second end of the inclined split bolt main body on the second template and the second supporting edge on the second side of the structure to be concreted, and tightening the second end of the inclined recoverable split bolt and the second end of the inclined split bolt main body in a split manner;
   step 5): pouring concrete; after a strength of the concrete reaches a predetermined strength, dismantling the first wedge-shaped fasteners and the first nuts for fixing the inclined recoverable split bolt, and pulling out the inclined recoverable split bolt in the hole reserved sleeve; dismantling the recoverable bolt joints, the second wedge-shaped fasteners and the second nuts for fixing the inclined split bolt main body; and dismantling the first template and the second template;
   step 6): cleaning up floating dust and construction waste in bolt holes at opposing ends of the hole reserved sleeve and the inclined split bolt main body; and plugging the bolt holes at the opposing ends of the inclined split bolt main body with a radiation-proof mortar incorporated with a micro-expanding agent and a waterproof agent to obtain plugged bolt holes, and spraying a radiation-proof coating on surfaces of the plugged bolt holes and the sealing rings; and
   step 7): after a construction of a pipeline or a line in the hole reserved sleeve is finished, plugging openings at opposing ends of the hole reserved sleeve with the radiation-proof mortar incorporated with the micro-expanding agent and the waterproof agent to obtain plugged openings, and then spraying the radiation-proof coating on surfaces of the plugged openings at the opposing ends of the hole reserved sleeve.

2. The construction method for the radiation-proof concrete hole reserved split bolt according to claim 1, wherein in the step 1), temporary rubber plugs are arranged at opposing ends of the hole reserved sleeve for protection; the hole reserved sleeve is fixed on a main reinforcing bar of the structure to be concreted through fasteners or in a steel wire binding mode.

3. The construction method for the radiation-proof concrete hole reserved split bolt according to claim 1, wherein in the step 2), when the inclined recoverable split bolt is mounted, temporary rubber plugs of the hole reserved sleeve are removed; and a gap between the inclined recoverable split bolt and a sleeve main body is fixed with a rubber gasket for temporary fixation.

4. The construction method for the radiation-proof concrete hole reserved split bolt according to claim 1, wherein the inclined split bolt main body is fixed on a main reinforcing bar of the structure to be concreted through fasteners or in a steel wire binding mode in the step 3); further, a portion of the sealing ring exceeds the inclined split bolt main body and the recoverable bolt joint, and the portion of the sealing ring is tightly attached to the first template and the concrete.

5. The construction method for the radiation-proof concrete hole reserved split bolt according to claim 1, wherein in the steps 6) and 7), the radiation-proof mortar is incorporated with a material with certain radiation absorption capacity.

* * * * *